United States Patent
Xu et al.

(10) Patent No.: US 10,810,492 B2
(45) Date of Patent: Oct. 20, 2020

(54) MEMORY SIDE ACCELERATION FOR DEEP LEARNING PARAMETER UPDATES

(71) Applicant: HEWLETT PACKARD ENTERPRISE DEVELOPMENT LP, Houston, TX (US)

(72) Inventors: Cong Xu, Palo Alto, CA (US); Qiong Cai, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 704 days.

(21) Appl. No.: 15/417,760

(22) Filed: Jan. 27, 2017

(65) Prior Publication Data
US 2018/0218257 A1    Aug. 2, 2018

(51) Int. Cl.
| G06F 3/06 | (2006.01) |
|---|---|
| G06N 3/08 | (2006.01) |
| G06F 13/16 | (2006.01) |
| G06N 3/04 | (2006.01) |
| G06N 3/063 | (2006.01) |
| G06F 9/48 | (2006.01) |

(52) U.S. Cl.
CPC .......... G06N 3/08 (2013.01); G06F 9/4806 (2013.01); G06N 3/0454 (2013.01); G06N 3/063 (2013.01)

(58) Field of Classification Search
CPC ........ G06N 3/08; G06N 3/0454; G06N 3/063; G06F 9/4806
USPC ...................................................... 706/1–62
See application file for complete search history.

(56) References Cited

U.S. PATENT DOCUMENTS

| 8,768,870 | B1 * | 7/2014 | Corrado ................. G06N 20/00 |
|---|---|---|---|
| | | | 706/12 |
| 9,031,844 | B2 | 5/2015 | Yu et al. |
| 10,496,884 | B1 * | 12/2019 | Nguyen ............. G06K 9/00671 |
| 10,678,233 | B2 * | 6/2020 | Cella ................ G05B 19/41875 |
| 2015/0193695 | A1 | 7/2015 | Cruz Mota et al. |
| 2016/0232445 | A1 | 8/2016 | Srinivasan et al. |
| 2016/0259857 | A1 | 9/2016 | Wang et al. |
| 2016/0321777 | A1 | 11/2016 | Jin et al. |
| 2016/0379111 | A1 | 12/2016 | Bittner et al. |
| 2016/0379115 | A1 | 12/2016 | Burger et al. |

(Continued)

FOREIGN PATENT DOCUMENTS

| WO | WO-2015154216 | 10/2015 |
|---|---|---|
| WO | WO-2017003888 | 1/2017 |

OTHER PUBLICATIONS

Dean, J., et al., "Large Scale Distributed Deep Networks", 2012, Advances in Neural Information Processing Systems 25 (NIPS 2012) (Year: 2012).*

(Continued)

*Primary Examiner* — Brandon S Cole
(74) *Attorney, Agent, or Firm* — Hewlett Packard Enterprise Patent Department (57) ABSTRACT

Examples disclosed herein relate to using a memory side accelerator to calculate updated deep learning parameters. A globally addressable memory includes deep learning parameters. The deep learning parameters are partitioned, where each partition is associated with a memory side accelerator. A memory side accelerator is to receive calculated gradient updates associated with its partition and calculate an update to the deep learning parameters associated with the partition.

22 Claims, 4 Drawing Sheets

(56) References Cited

U.S. PATENT DOCUMENTS

2017/0061294 A1* 3/2017 Weston ............... G06N 3/0454
2017/0193390 A1* 7/2017 Weston ............... G06N 20/00

OTHER PUBLICATIONS

Cui, H., et al., "GeePS: scalable deep learning on distributed GPUs with a GPU-specialized parameter server", 2016, In Proceeding EuroSys '16 Proceedings of the Eleventh European Conference on Computer Systems, Artcle 4, London, United Kingdom—Apr. 18-21, 2016 (Year: 2016).*

Chilimbi, T., et al., "Project Adam: Building an Efficient and Scalable Deep Learning Training System", 2014, Proceedings of the 11th USENIX Symposium on Operating Systems Design and Implementation. Oct. 6-8, 2014 • Broomfield, CO (Year: 2014).*

PCT; "International Search Report"; cited in Appl. No. PCT/US2018015753; dated May 15, 2018; 3 pages.

Faraboschi, et al.; Beyond Processor—Centric Operating Systems; Hewlett-Packard Labs; 7 pages; Retrieved Jan. 17, 2017.

Forrest N. Iandola, "Firecaffe: Near-linear Acceleration of Deep Neural Network Training on Compute Clusters," 2015, 13 pages, <https://arxiv.org/pdf/1511.00175.pdf>.

Guc, Q. et al., 3D-stacked Memory-side Acceleration; Accelerator and System Design, (Research Paper), 2014, 6 Pgs.

Li, et al; Parameter Server for Distributed Machine Learning; Carnegie Mellon University 2Google Strategic Technologies; 10 pages; Retrieved Jan. 17, 2017.

Song, L. et al, "Pipelayer: a Pipelined Reram-based Accelerator for Deep Learning," 2017, 7 pages, http://alchem.usc.edu/portal/static/download/nn_memristor.pdf.

Tayfun Gokmen, "Acceleration of Deep Neural Network Training with Resistive Cross-point Devices," 2016, 19 pages. <https://arxiv org/ftp/arxiv/papers/1603/1603 07341 pdf>.

Trishul Chilimbi, "Project Adam: Building a Efficient and Scalable Deep Learning Training System," Proceedings of the 11th Usenix Symposium on Operating Systems Design and Implementation, Oct. 6, 2014, pp. 571-582, XP055243209.

* cited by examiner

MEMORY SIDE ACCELERATION FOR DEEP LEARNING PARAMETER UPDATES

BACKGROUND

Training a large-scale deep learning model can take weeks to months as the size of data increases. Distributed deep learning reduces the training time by separating the computation into multiple devices across multiple nodes. For example Distbelief, Project Adam, and Hama are examples of projects to parallelize training for large models on thousands of processors.

BRIEF DESCRIPTION OF THE DRAWINGS

The following detailed description references the drawings, wherein.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

DETAILED DESCRIPTION

Deep learning can be used to perform tasks based on learned information. Examples of tasks that can be performed using deep learning include colorizing black and white images, adding sounds to silent movies, automatic machine translation, object classification in photographs, automatic handwriting generation, character text generation, image caption generation, automatic game playing, etc. Various implementations can be used based on what type of task is being performed.

In each case, training data can be used to train model parameters. The model parameters can then be used to implement the task based on an algorithm for that task. In one example, the task is automated machine translation (e.g., translating words in a picture on a smart phone from one language to another). Training for this task can include image recognition to determine what letters are present in the scene. The identified letters can be turned into text, translated, and then the image can be recreated with the translated text. Training sets can include fonts or known data sets (e.g., hand written data sets for a language).

Training a large-scale deep learning model can take weeks to months as the size of data increases. Distributed deep learning reduces the training time by separating the computation into multiple devices across multiple nodes. For example Distbelief, Project Adam, and Hama are examples of projects to parallelize training for large models on thousands of processors.

A commonly used technique in distributed deep learning for both convolution neural network and recurrent neural network models is data parallelism. Here, each worker (e.g., a central processing unit (CPU) or graphical processing unit (GPU)) receives a subset of a batch of training data. Each worker iteratively processes new training data from its subset of batches of the training data. The workers communicate by exchanging gradient updates. A parameter server is used to provide each of the workers the same model parameters.

The following is an example model of distributed deep learning. In this model of distributed deep learning, each worker receives a subset of training data and a full set of model parameters for each iteration of training. At the beginning of one iteration, every worker sends a pull request to the parameter server and gets a latest copy of the parameters W, which might contain hundreds of millions of floating-point values for a large deep learning model. Each copy of the parameters on each device is called a model replica. Each model replica works on a different input training data subset. For example, each subset can contain different images and all the subsets form one large batch of images for one iteration.

Each model replica calculates its data gradients (in an example with three workers $\Delta D1, \Delta D2, \Delta D3$) with its own mini-batch input and sends the gradients back (usually a push request) to the parameter server. The parameter server gathers the gradients from all the workers, calculates the average of the gradient, and updates the model accordingly. For example, a new W' can equal the previous W plus a learning rate times an average of the data gradients. Shown as an equation, the new W' can be expressed as $W'=W+$ learning rate*average $(\Delta D1, \Delta D2, \Delta D3)$. There is no explicit coordination among the model replicas other than implicit synchronization through the parameter server.

The traditional parameter server design has several limitations. Implementing such a system architecture is complex and usually requires engineering efforts because designing a reliable parameter server capable of handling many parallel pull/push requests is non-trivial. Dedicating CPU processes to perform a summation (or an average) of all data activations is not optimal in terms of number of read/write operations to memory. Further, periodic checkpointing of the model parameters incurs both latency and energy overhead.

Accordingly, various examples described herein use memory side acceleration to simplify the parameter server design. Each of the model parameters are stored in a globally addressable memory pool. The memory pool can be non-volatile, which eliminates the overhead of checkpointing these model parameters. Instead of using a single parameter server, the functionality of the parameter server can be split among device nodes and implemented using memory side accelerators (MSAs). Each MSA can be customized to accelerate the partial model update process during each iteration in the training of deep learning applications. Example customizations include the use of Single Instruction, Multiple Data (SIMD) single-precision floating-point execution units, scratchpad memory, and a timer.

As used herein, deep learning parameters are data structures (e.g., floating point variables) that can be used with a set of input data to answer a question according to an algorithm that can be executed by a processing element. In a simple example, the algorithm can be executed to find features in an image based on the parameters (e.g., if a dot product of weights and an input set plus a bias>a threshold then the test is true, else, the test is false for presence of a particular feature). In some examples, the parameters can include weight parameters. In some examples, the parameters can include bias parameters. In other examples, the parameters can include other parameters that can be used to answer a question (or multiple questions) that are not technically a weight or a bias. Further, in some examples, the parameters can include thresholds.

The deep learning parameters can be trained using a deep learning approach. As noted above, the training can involve determination of a change to each parameter based on training information. Examples of such learning algorithms include gradient descent, various approaches used by Distbelief, Project Adam, and Hama, and stochastic gradient descent by backpropogation, among others.

As used herein, a gradient is a change to a parameter that is learned based on training information. The gradients can be used during a learning process. In an example of character recognition, a handwritten character and a known character value can be used as the training set for learning. Further, a learning rate can be incorporated as part of a gradient value or be processed at a later time.

Figure 1:
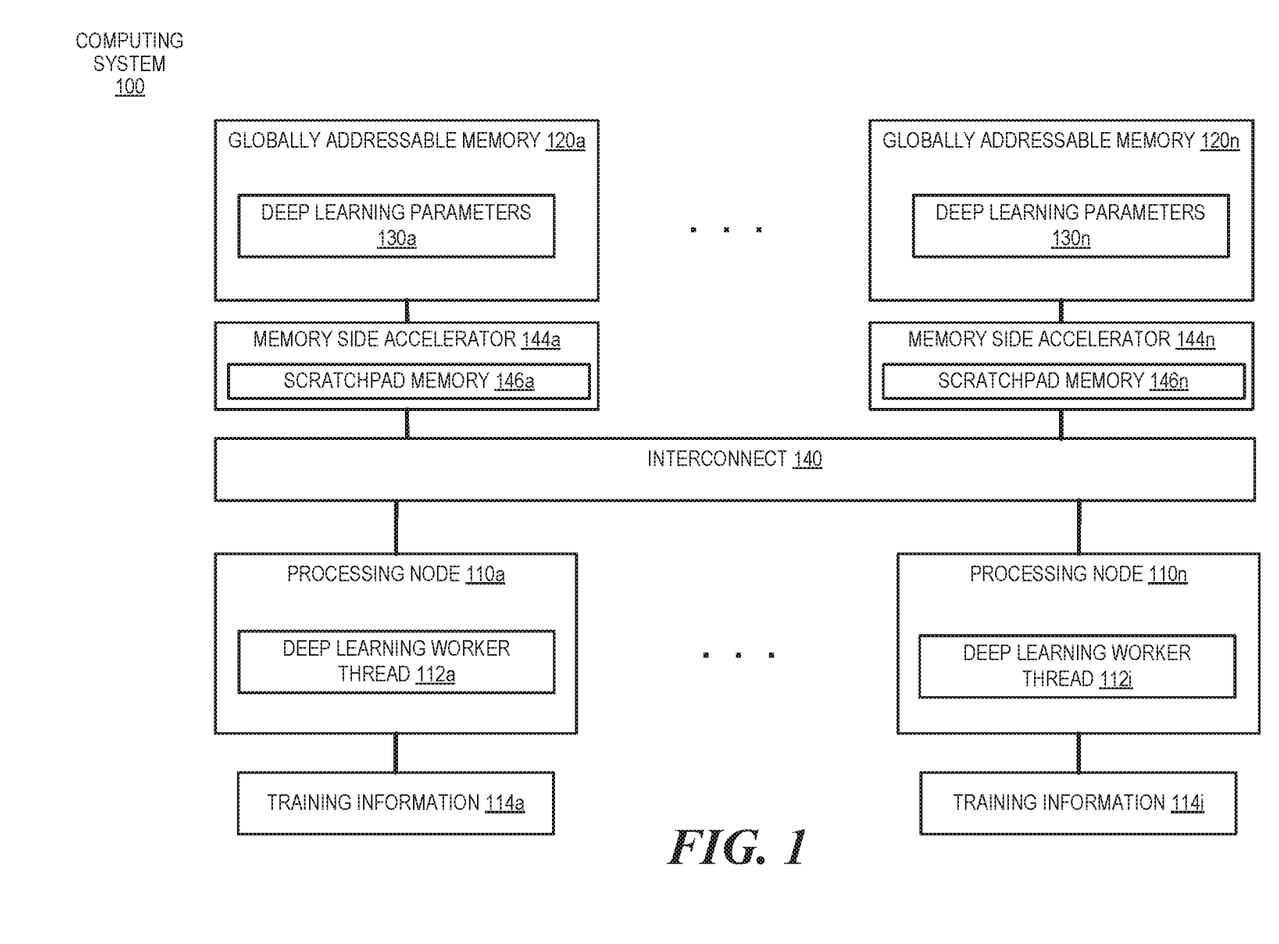
FIGS. 1 and 2 are block diagrams of computing systems capable of using memory side accelerators to facilitate deep learning, according to various examples.
Figure 2:
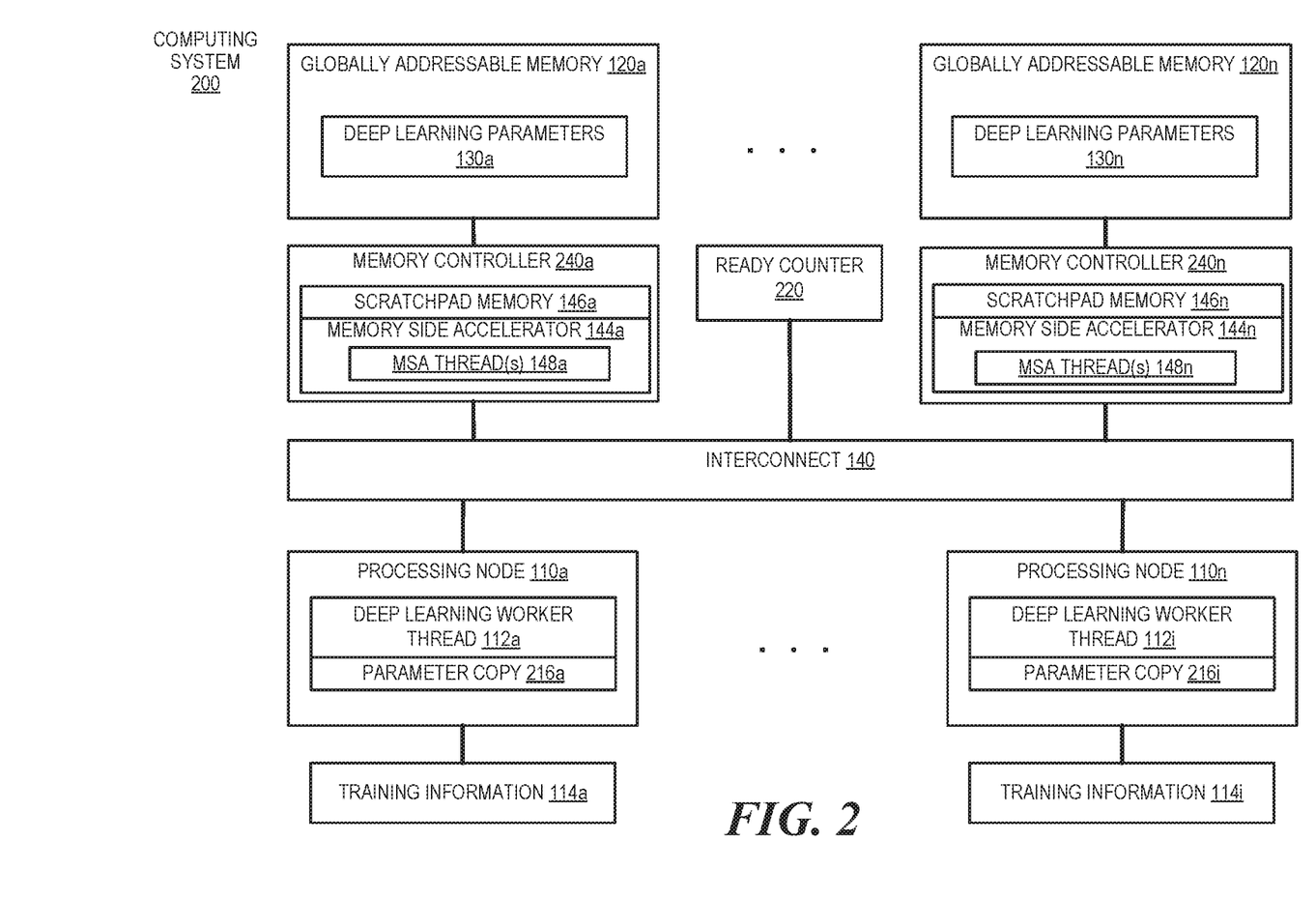

FIGS. 1 and 2 are block diagrams of computing systems capable of using memory side accelerators to facilitate deep learning, according to various examples. The computing systems 100, 200 can include a number of processing nodes 110a-110n that can be used to process deep learning worker threads 112a-112i. The deep learning worker threads 112a-112i can each use corresponding training information 114a-114i. The processing nodes 110 can be connected to globally addressable memory 120a-120n using an interconnect 140.

In some examples, each portion of the globally addressable memory 120a-120n can be connected via a memory controller 240a-240n, as shown in FIG. 2. The memory controllers 240a-240n can each include a memory side accelerator 144a-144n. Further, the memory controllers 240a-240n may include a scratchpad memory 146a-146n. Deep learning parameters 130a-130n can be included in the globally addressable memory 120a-120n. In some examples, for redundancy and/or bandwidth, a portion of globally addressable memory 120 may be connected to the interconnect 140 via more than one memory controller 240. The memory controller 240 can accept memory requests from the fabric, schedule, and issue memory requests to the memory modules associated with the portion of globally addressable memory 120 associated with a particular memory controller 240. The MSAs can be implemented using a set of programmable cores incorporated in each memory controller. This can enable memory side acceleration for memory-intensive workloads.

Each of the processing nodes 110 can be used to implement a deep learning worker thread 112 for a subset of the training information 114. In some examples, there can be a master, slave relationship between a single deep learning worker thread 112a and a corresponding MSA thread 148a-148n on each of the memory controllers 240a-240n used to implement the approach described herein.

The following is an example model of distributed deep learning corresponding to computing system 200. In this model of distributed deep learning, each deep learning worker thread 112 receives a subset of training information 114 and a full set of model parameters (parameter copy 216) for each iteration or epoch of training. At the beginning of one iteration or epoch, each deep learning worker thread 112 pulls the full set of deep learning parameters 130 from the globally addressable memory 120. As noted above, this can include a large number (e.g., hundreds of millions of floating-point values). Each copy of the parameters is called a parameter copy 216. The deep learning parameters can correspond to the deep learning model used. For example, in the case of image processing, the parameters may be associated with features found in an image. In some examples, the features have a level of importance associated. Examples of deep learning parameters can include weight parameters, bias parameters, and threshold parameters.

The deep learning parameters 130 may be stored using one or multiple data structures, such as a tensor, an array, a multi-dimensional vector, etc. For example, the deep learning parameters can be stored as a plurality of floating point numbers (e.g., single-precision floating point values) stored in a tensor data structure. Each of the partitions can include a subset of the floating point numbers. In some examples, the floating point values can be addressed using load/store instructions. Conceptually speaking, a tensor of all of the deep learning parameters 130 combined can be split into partitions of subsets of the tensor in each of the partitions, for example, deep learning parameters 130a, 130n, etc.

The deep learning parameters 130 are partitioned across the globally addressable memory 120 according to MSAs 144 and/or memory controllers 240. For explanatory purposes, in a simple example of three partitions where each partition includes one hundred parameters, a first MSA 144a can be associated with a first partition of the deep learning parameters 130 (representing parameters 0-99), a second MSA (not shown) can be associated with a second partition of the deep learning parameters (not shown) (representing parameters 100-199), and a third MSA 144n can be associated with a third partition of the deep learning parameters 130n (representing parameters 200-299). Each deep learning worker thread 112 pulls the deep learning parameters 130 by pulling a copy of each of the partitions. The deep learning worker threads 112 can pull the copies via respective associated memory controllers 240.

Each deep learning worker thread 112 can work on a different input training data subset of the training information. The number of deep learning worker threads 112 can be different from the number of partitions that the deep learning parameters are stored in. As noted above, in one example, each set of training information 114a-114n can include a set of images. In some examples, duplicates of the training information may occur (e.g., one image may be included in two subsets of training information). The subsets of the training information 114a-114n combined can make up a large batch of training information used for an iteration of training.

As used herein, a deep learning worker thread 112 is a process that executes on a processing node 110 that determines data gradients based on a parameter copy 216 and associated training information 114. Each deep learning worker thread 112 calculates its data gradients (in an example with three workers $\Delta D1$, $\Delta D2$, $\Delta D3$) with its own respective training information and send the gradients back (e.g., via a push request) to the memory controllers 240/MSAs 144 that correspond to each partition. In the example above, each deep learning worker thread 112a is to return a gradient update to MSA 144a corresponding to parameters 0-99, another gradient update to the second MSA corresponding to parameters 100-199, and a third gradient update to the third MSA 144n corresponding to parameters 200-299. In some examples, the deep learning worker threads 112 can use an instruction to write (or use another custom instruction) to a particular address range that is associated with the MSA 144. The MSA 144 can expect the address and execute an MSA thread 148 to process the information.

Calculation of the gradients can be based on specific implementation of the model and use case. The calculation can be based on an algorithm that is executed by a physical processing element of the processing node using the parameter copy 216 and associated training information 114.

In one example, the gradients determined by the deep learning worker threads can be in the form of gradients that take into account a learning rate (e.g., a multiplier). In another example, the gradients can be in the form of data gradients that do not take into account a learning rate. In this other example, the MSA 144 can perform the calculation to take into account the learning rate.

In response to the deep learning worker threads 112 pushing the calculated gradients up to the corresponding MSAs 144, the respective MSAs 144 receive the gradients. Each MSA 144 can execute an MSA thread 148 or multiple MSA threads 148 to calculate an updated deep learning parameter for the partition associated with the MSA 144. The MSA 144 can store parameter updates in the associated scratchpad memory 146. This set of updated deep learning parameters can be considered a partial result. In one example, the update can add the received gradient to the current temporary set of updated deep learning parameters for the partition. The original set of the parameters in the scratchpad memory 146a can be the deep learning parameters 130 associated with the partition at the beginning of the iteration/epoch. As noted above, SIMD single-precision floating point instructions may be used to implement MSA thread execution.

In one example, each of the MSAs 144 can update the corresponding partition of the deep learning parameters 130 in the globally addressable memory 120 based on the respective updated copy stored in the scratchpad memory 146. The update can be triggered based on a condition.

In one example, the condition can be based on reception by the MSA 144 of calculated gradients from each of the deep learning worker threads 112 (e.g., once the MSA 144 updates the temporary deep learning parameters in the partition based on each of the received gradients).

In another example, the condition can include a timer reaching a preset value after a first one of the calculated gradient updates is received by the respective MSA 144. In one example for illustrative purposes, assume that there are one hundred deep learning worker threads 112. When the MSA 144 receives the first set of calculated gradient updates, the timer starts. In some examples, the timer can be incorporated as part of the MSA 144. Other triggers for the timer can also be used (e.g., starting the timer at the beginning of an iteration). When the timer ends, the globally addressable memory 120 is updated with the current updated deep learning parameters 130 in the scratchpad memory 146. In one example, the remaining gradients can be discarded. Due to the nature of deep learning being self-error-tolerant, the loss may be considered acceptable. In some examples, either of the conditions being met can cause the update of the globally addressable memory 120.

When each MSA 144 updates the globally addressable memory 120, it can also update (e.g., increment by one) a ready counter 220. The ready counter 220 can be stored in the globally addressable memory 120. The ready counter 220 can be considered to be in a ready state when each of the MSAs 144 have updated their respective partitions of the deep learning parameters 130 in the globally addressable memory 120. The ready counter being ready can be used to trigger the next iteration or epoch for deep learning. For example, the deep learning worker threads 112 can poll the ready counter 220 or a separate thread can be used to poll the ready counter 220 and let each deep learning worker thread 112 know when the ready counter 220 is ready. In another example, instead of a ready counter, each MSA 144 may set a ready signal for its respective partition that each of the deep learning worker threads 112 can read. In some examples, the ready signal can be part of a single data structure.

As noted above, the globally addressable memory 120 can be non-volatile. Because of this feature, the deep learning parameters 130 need not be check pointed, which can reduce workload overhead for the process. In another example, the training information 114 can be stored in a volatile memory associated with the respective processing nodes 110 corresponding to the deep learning worker threads 112. In one example, the volatile memory can be direct attached to the processing nodes 110. In another example, the direct attached memory can be non-volatile instead of volatile.

With the approaches described here, memory capacity and bandwidth requirements can be reduced. For example, because the partial results are stored in the scratchpad memory 146, less memory is needed to store each of the gradients and then perform operations on the whole set. Moreover, the number of read/write operations can be reduced. For example, in models such as AlexNet or ResNet-152, millions of parameters may be used, but, per iteration, these are read once from non-volatile memory and written once per iteration. In an example using 60 million parameters, 120 million references would be made. On the other hand, a parameter server collecting all of the data gradients and then processing these, the memory references during a single iteration may be as high as 7.74 billion.

As used herein, a processing node 110 is a shared memory processing element that has one or multiple physical processors within the processing node. In one example, each processing node includes a direct attached local main memory (e.g., random access memory) as well as one or multiple caches within the processing node. In another example, the processing nodes 110 can include access to the globally addressable memory 120 via the interconnect 140.

The interconnect 140 can be used to implement a fabric memory. In one example, direct attached memory between multiple processing nodes 110 are globally addressable using the interconnect 140. In some examples, the interconnect 140 can be implemented using a communication network, such as Ethernet, InfiniBand, Fibre Channel, and SeaStar. Further, in some examples, the globally addressable memory 120 can be non-volatile. As such, because the globally addressable memory 120 is non-volatile, the system need not spend time to checkpoint the parameters. Examples of non-volatile memory include memristors, non-volatile Resistive Random Access Memory (ReRAM), flash memory, Ferroelectric RAM, Magnetoresistive RAM, Phase-change RAM, Millipede memory, etc. In some examples, more than one memory controller 240 can be used to connect the interconnect 140 to a particular portion of the globally addressable memory.

The computing systems 100, 200 can communicate with other devices using input/output interfaces and peripheral devices (e.g., using network interface cards, keyboard, mouse, speaker, display, etc.). For example, processing nodes can communicate with other processing nodes and/or other devices via one or multiple communication network(s) (not shown). The communication network(s) can use wired communications, wireless communications, or combinations thereof. Further, the communication network(s) can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network can be in the form of a direct network link between devices. Various communication structures and infrastructure can be utilized to implement the communication network(s).

By way of example, the processing nodes 110 and other devices can communicate with each other and other components with access to the communication network via a communication protocol or multiple protocols. A protocol can be a set of rules that defines how nodes of the communication network interact with other devices. Further, communications between network nodes can be implemented by exchanging discrete packets of data or sending messages. Packets can include header information associated with a protocol (e.g., information on the location of the network node(s) to contact) as well as payload information.

Figure 3:
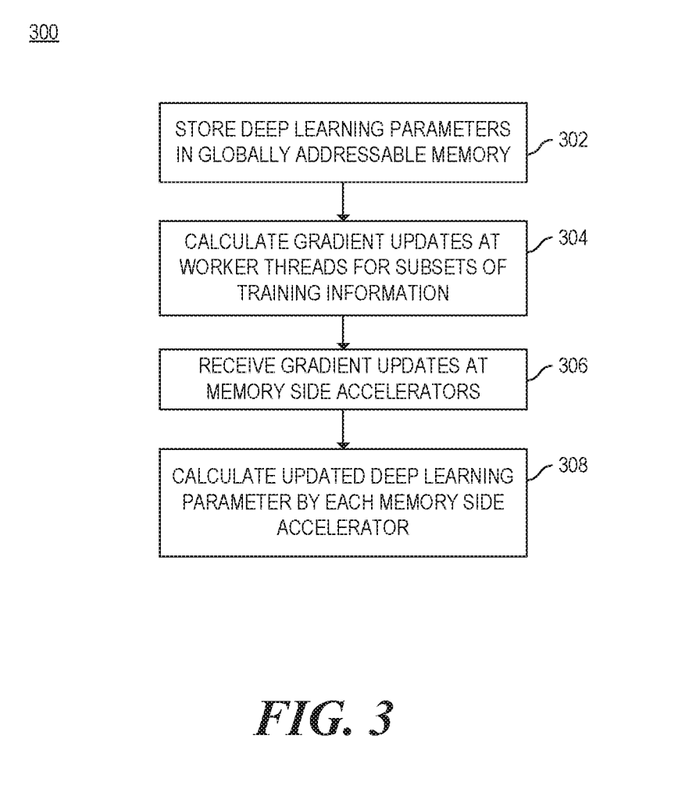
FIG. 3 is a flowchart of a method for calculating updated deep learning parameters using memory side accelerators, according to an example.

FIG. 3 is a flowchart of a method for calculating updated deep learning parameters using memory side accelerators, according to an example. Although execution of method 300 is described below with reference to computing system 200, other suitable components for execution of method 300 can be utilized (e.g., computing system 100). Additionally, the components for executing the method 300 may be spread among multiple devices. Method 300 may be implemented in the form of executable instructions stored on a machine-readable storage medium and/or in the form of electronic circuitry.

At 302, deep learning parameters 130 are stored in a globally addressable memory 120 that is addressable by each of a number of processing nodes 110. As noted above, the globally addressable memory 120 includes a number of portions that are each coupled to a memory controller 240 that includes a MSA 144. In some examples, more than one memory controller 240 may be used to access the memory of a single portion. Each of the MSAs 144a-144n is associated with a partition of the deep learning parameters 130a-130n. As noted above, the deep learning parameters can be included in a tensor of floating point numbers. Each partition would include a subset of the deep learning parameters. In one example, there can be Q MSAs 144 and each MSA 144 can be associated with roughly 1/Q of the parameters. Other distributions of the partitions can be used.

At the beginning of an iteration, deep learning worker threads 112 can pull down a parameter copy 216 for each training thread. In one example, there can be P workers and each can take roughly 1/P of the training information. As noted above each of the partitions can be copied to generate the parameter copy 216. Further, the scratchpad memory 146 and any counters/ready signals can be cleared at the beginning of an iteration or epoch. Other distributions of the training information can be used.

At 304, the deep learning worker threads 112 can calculate gradient updates for the respective subsets of training information 114 using the corresponding processing node 110. The deep learning worker threads 112 can use an instruction to provide the partitions of the calculated gradient updates to the MSAs associated with each partition.

At 306, each MSA 144 receives calculated gradient updates for the partition corresponding to the MSA 144 from one or multiple deep learning worker threads 112. At 308, each MSA 144 calculates an updated deep learning parameter for the corresponding partition of the deep learning parameters 130. As part of calculating the updated deep learning parameter, an MSA thread 148 can be created for each of the deep learning worker threads 112 that provide calculated gradient updates. Each thread can be used to load a current version of the parameters in the scratchpad memory 146 and the associated calculated gradient, add the two together, and then store the updated temporary deep learning parameter in the scratchpad memory 146.

As noted above, based on a condition, each of the MSAs 144 can update the corresponding partition of the deep learning parameters in the globally addressable memory 120 based on the respective updated copy in the respective scratchpad memory 146. As noted above, in one example, the condition is based on the reception of each of the calculated gradient updates associated with the partition from each of the subsets of the training information (e.g., the corresponding threads). In another example, the condition includes a timer reaching a preset value. In some examples, the preset value can be set by one of the deep learning worker threads 112 or a separate control thread. Moreover, the timer can start at a customized time (e.g., at the start of an iteration, after a first one of the deep learning worker threads 112 provides a gradient update, etc.). As noted above, a ready counter or signal can be incremented/updated each time a partition of the deep learning parameters are written back to the globally addressable memory 120.

Figure 4:
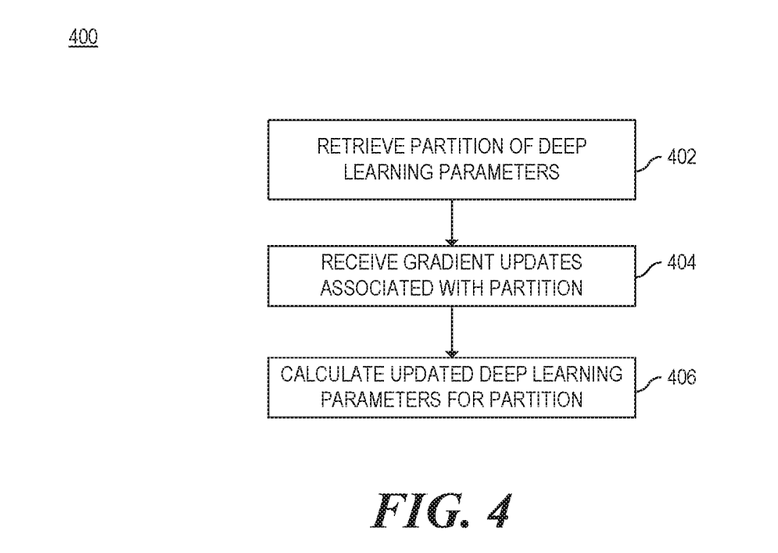
FIG. 4 is a flowchart of a method for calculating deep learning parameters for a partition of parameters at a memory side accelerator, according to an example.
Figure 5:
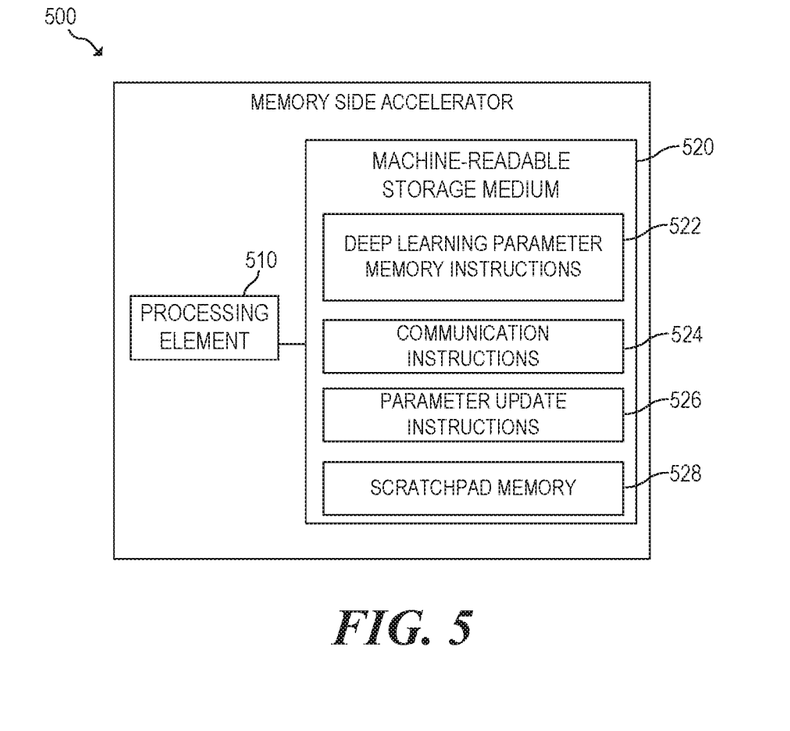
FIG. 5 is a block diagram of a memory side accelerator capable of facilitating deep learning, according to an example.

FIG. 4 is a flowchart of a method for calculating deep learning parameters for a partition of parameters at a memory side accelerator, according to an example. FIG. 5 is a block diagram of a memory side accelerator capable of facilitating deep learning, according to an example.

Although execution of method 400 is described below with reference to MSA 500, other suitable components for execution of method 400 can be utilized (e.g., MSA 144). Method 400 may be implemented in the form of executable instructions stored on a machine-readable storage medium, such as storage medium 520, and/or in the form of electronic circuitry.

Processing element 510 may be one or multiple central processing units (CPU), one or multiple programmable processors, one or multiple semiconductor-based microprocessors, other hardware devices suitable for retrieval and execution of instructions stored in machine-readable storage medium 520, or combinations thereof. In one example, a SIMD instruction set can be used to implement features of the processing element 510. The processing element 510 can be implemented as a physical device. Moreover, in one example, the processing element 510 may include multiple cores on a chip, include multiple cores across multiple chips, or combinations thereof. Processing element 510 may fetch, decode, and execute instructions 522, 524, and 526 to implement the memory side acceleration tasks described herein. As an alternative or in addition to retrieving and executing instructions, processing element 510 may include at least one integrated circuit (IC), other control logic, other electronic circuits, or combinations thereof that include a number of electronic components for performing the functionality of instructions 522, 524, and 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for providing memory side acceleration capabilities in a deep learning model.

At 402, the processing element 510 can retrieve a partition of a number of deep learning parameters stored in a globally addressable memory that is addressable by each of a number of processing nodes in the computing system by executing deep learning parameter memory instructions 522. As noted above, the globally addressable memory includes a number of portions that are each coupled to at least one of a number of MSAs. Each of the MSAs is associated with a partition of the deep learning parameters. Further, the deep learning parameters are included as part of a data structure, for example, a tensor of floating point numbers, and each partition includes a subset of the tensor.

At 404, the MSA 500 receives multiple gradient updates associated with the partition that corresponds to the MSA 500 from a number of deep learning worker threads of the computing system that are used to train the deep learning model from batches of training data. Communication instructions 524 can be executed or separate communication interfaces can be implemented to determine which information received at a memory controller that the MSA 500 is a part of is a gradient update. In one example, the corresponding threads can use an instruction to an address associated with the MSA 500 to trigger usage of the MSA.

At 406, the MSA 500 can calculate multiple updated deep learning parameters associated with the partition in a scratchpad memory 528 based on the received gradients by executing parameter update instructions 526. In one example, the retrieved partition of the deep learning parameters is a starting point and a first set of gradients is added to the deep learning parameters and then the result is stored in the scratchpad memory 528 as a partial update. Following received gradient updates are then added to the partial update when received and stored in the scratchpad memory 528. A thread of execution can be implemented to perform the partial update. In some examples, if a gradient is received while a thread is working on a partial update, the gradient can be stored in the scratchpad memory 528 and used when the thread has completed execution. In other examples, the other threads can work at the same time (e.g., on different portions of the parameters).

The MSA 500 can update the deep learning parameters of the partition in the globally addressable memory once a condition is met. As noted above, in one example, the condition can be reception and processing of each of the gradients expected to be received from the corresponding worker threads that are used for training. In another example, the condition can be based on a timer that starts when a first one of the gradients is received and ends when it meets a predetermined threshold number. As noted above, a thread of execution can customize the threshold number.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A computing system comprising:
a plurality of processing nodes;
a globally addressable memory that is addressable by each of the processing nodes;
a plurality of memory controllers each with memory side accelerators each associated with a portion of the globally addressable memory,
wherein each memory controller is connected to each of the processing nodes via an interconnect and the processing nodes are configured to access the portions of the globally addressable memory via the respective memory controllers,
wherein each memory side accelerator includes a scratchpad memory;
a plurality of deep learning parameters stored in the globally addressable memory,
wherein the plurality of deep learning parameters correspond with a plurality of deep learning model replicas,
wherein each of the plurality of deep learning model replicas are configured to write updates directly to the globally addressable memory with store instructions absent issuing network push or pull requests, and
wherein each memory side accelerator is associated with a partition of the deep learning parameters; and
a plurality of deep learning worker threads executing on the respective processing nodes to each calculate gradient updates based on corresponding subsets of training information,
wherein each memory side accelerator is to receive a plurality of the calculated gradient updates associated with the respective partition via the interconnect and calculate updated deep learning parameters for the respective partition using the corresponding scratchpad memory.

2. The computing system of claim 1, wherein each memory side accelerator is further to update a copy of the respective partition of the deep learning parameters in the scratchpad memory according to the received calculated gradient updates associated with the respective partition.

3. The computing system of claim 2, wherein the respective memory side accelerator is further to update the corresponding partition of the deep learning parameters in the globally addressable memory based on the respective updated copy in the respective scratchpad memory based on a condition.

4. The computing system of claim 3, wherein the condition is based on reception of calculated gradient updates associated with the partition from each of the subsets.

5. The computing system of claim 3, wherein the condition includes a timer reaching a preset value after a first one of the calculated gradient updates is received by the respective memory side accelerator.

6. The computing system of claim 3, further comprising a ready counter in the globally addressable memory that is incremented when each partition of the deep learning parameters in the globally addressable memory is updated.

7. The computing system of claim 1, wherein the globally addressable memory is non-volatile, and wherein the subset of training information for one of the deep learning worker threads is included in a volatile memory local to one of the processing nodes corresponding to the one deep learning worker thread.

8. The computing system of claim 1, wherein deep learning parameters are included in a tensor of floating point numbers and each partition includes a subset of the tensor.

9. A method comprising:
receiving a plurality of deep learning parameters in a globally addressable memory that is addressable by each of a plurality of processing nodes,
wherein the plurality of deep learning parameters correspond with a plurality of deep learning model replicas,
wherein each of the plurality of deep learning model replicas are configured to write updates directly to the globally addressable memory with store instructions absent issuing network push or pull requests,
wherein the globally addressable memory includes a plurality of portions, wherein each of the portions are coupled to a memory controller that includes a memory side accelerator,
wherein each of the memory side accelerators is associated with a partition of the deep learning parameters,
wherein each memory controller is connected to an interconnect that is connected to each of the processing nodes, and
wherein the portions of the globally addressable memory are configured to be accessed by the processing nodes via the memory controller coupled to each respective portion;
calculating gradient updates at deep learning worker threads based on corresponding subsets of training information at respective processing nodes;
receiving, at each memory side accelerator, via the interconnect, a plurality of the calculated gradient updates associated with the respective partition from the respective processing nodes; and
calculating, at each memory side accelerator, an updated deep learning parameter for the respective partition.

10. The method of claim 9, further comprising:
updating, by each memory side accelerator, a copy of the respective partition of the deep learning parameters in a scratchpad memory associated with the corresponding memory side accelerator, according to the received calculated gradient updates associated with the respective partition; and
updating, by each memory side accelerator, the corresponding partition of the deep learning parameters in the globally addressable memory based on the respective updated copy in the respective scratchpad memory based on a condition.

11. The method of claim 10, wherein the condition includes reception of calculated gradient updates associated with the partition from each of the subsets of the training information.

12. The method of claim 10, wherein the condition includes a timer reaching a preset value after a first one of the calculated gradient updates is received by the respective memory side accelerator.

13. The method of claim 10, further comprising:
incrementing a ready counter in the globally addressable memory when each partition of the deep learning parameters in the globally addressable memory is updated.

14. The method of claim 9,
wherein the globally addressable memory is non-volatile, and
wherein the subset of training information for one of the deep learning worker threads is included in a volatile memory local to one of the processing nodes corresponding to the one deep learning worker thread.

15. The method of claim 9, wherein each memory side accelerator calculates the updated deep learning parameter in place at each memory side accelerator.

16. The method of claim 9, wherein each memory side accelerator calculates the updated deep learning parameter absent an allocation of memory for each parameter copy of a weight update from the processing nodes.

17. The method of claim 9, wherein the interconnect is a fabric memory configured to directly attach memory between the plurality of processing nodes.

18. The method of claim 9, wherein each of the plurality of deep learning model replicas are configured to read a copy of a weight directly from the globally addressable memory with load instructions absent issuing network push or pull requests.

19. A non-transitory machine-readable storage medium storing instructions that, if executed by a physical processing element of a first memory side accelerator of a computing system, cause the first memory side accelerator to:
retrieve a partition of a plurality of deep learning parameters stored in a globally addressable memory that is addressable by each of a plurality of processing nodes of the computing system,
wherein the plurality of deep learning parameters correspond with a plurality of deep learning model replicas,
wherein each of the plurality of deep learning model replicas are configured to write updates directly to the globally addressable memory with store instructions absent issuing network push or pull requests,
wherein the globally addressable memory includes a plurality of portions each respectively coupled to at least one of a plurality of memory side accelerators, including the first memory side accelerator, and
wherein each of the memory side accelerators is associated with a partition of the deep learning parameters;
receive a plurality of gradient updates associated with a first partition that corresponds to the first memory side accelerator from a plurality of deep learning worker threads working at processing nodes coupled to the first memory side accelerator via an interconnect that each of the processing nodes and memory side accelerators are connected to; and
calculate a plurality of updated deep learning parameters associated with the first partition in a scratchpad memory associated with the first memory side accelerator based on the received gradient updates.

20. The non-transitory machine-readable storage medium of claim 19, further comprising instructions that, if executed by the physical processing element, cause the first memory side accelerator to:
calculate a plurality of updated deep learning parameters for the first partition; and
update the globally addressable memory with the updated deep learning parameters for the first partition based on a condition.

21. The non-transitory machine-readable storage medium of claim 20, wherein the condition includes reception of the calculated gradient updates from each of the deep learning worker threads.

22. The non-transitory machine-readable storage medium of claim 20, wherein the condition includes a timer reaching a preset value after a first one of the calculated gradient updates is received by the first memory side accelerator.

* * * * *